United States Patent [19]
Choate

[11] Patent Number: 5,626,429
[45] Date of Patent: May 6, 1997

[54] KEYBOARD ARRANGEMENT TO MAXIMIZE ONE-HANDED TYPING SPEED AND TRAINING FOR ENGINEERING AND ARCHITECTURAL COMPUTER ASSISTED DRAWING AND DESIGN OR DISABLED TYPISTS

[76] Inventor: John I. M. Choate, c/o Pecan Pl., Ponca City, Okla. 74604

[21] Appl. No.: 415,562

[22] Filed: Apr. 3, 1995

[51] Int. Cl.$^6$ ........................................ B41J 5/10
[52] U.S. Cl. .......................................... 400/487; 400/472
[58] Field of Search ................................ 400/483, 484, 400/486, 487, 489, 494

[56] References Cited

U.S. PATENT DOCUMENTS

| | | | |
|---|---|---|---|
| 1,823,130 | 9/1931 | Smith | 400/483 |
| 4,519,721 | 5/1985 | Gardner | 400/486 |
| 4,927,279 | 5/1990 | Morgan | 400/486 |
| 4,940,346 | 7/1990 | Liljenquist | 400/486 |
| 5,003,301 | 3/1991 | Romberg | 400/489 |
| 5,352,050 | 10/1994 | Choate | 400/486 |
| 5,498,088 | 3/1996 | Choate | 400/486 |

FOREIGN PATENT DOCUMENTS

| | | | |
|---|---|---|---|
| 227991 | 7/1984 | Japan | 400/486 |
| 566904 | 1/1945 | United Kingdom | 400/486 |

OTHER PUBLICATIONS

IBM Technical Disclosure Bulletin vol. 28, No. 2 Jul. 1985 pp. 485–486.

Primary Examiner—Ren Yan

[57] ABSTRACT

A keyboard arranged for efficiency in learning and in operating. The keyboard arrangement that has the distinct advantage of maximizing the speed and efficiency for either fight one-handed or left one-handed typing while allowing for a smooth and easy transition from the QWERTY keyboard arrangement to the keyboard arrangement A keyboard that increases speed of training of one-handed or two-handed operators by color matching the keys to be reached by a specific finger. A keyboard to allow disabled, arthritic, and/or limited hand use typists, e.g., the disabled with limited finger movement, to increase their speed and use of the computer keyboard, and to reduce body, head, neck, eye, and sensory stress. Hoe keys are assigned according to the frequency of use of the letters. A user can select a new format with thirteen or more keys in the same location as the conventional typewriter letter format The keyboard is suitable for typewriters, personal computer keyboards. Different keyboards can be selected according to the frequency of use of the letters. By maintaining the same locations, most of the difficulty in relearning a new keyboard layout can be eliminated.

3 Claims, 7 Drawing Sheets

Figure 2 Right Hand Only

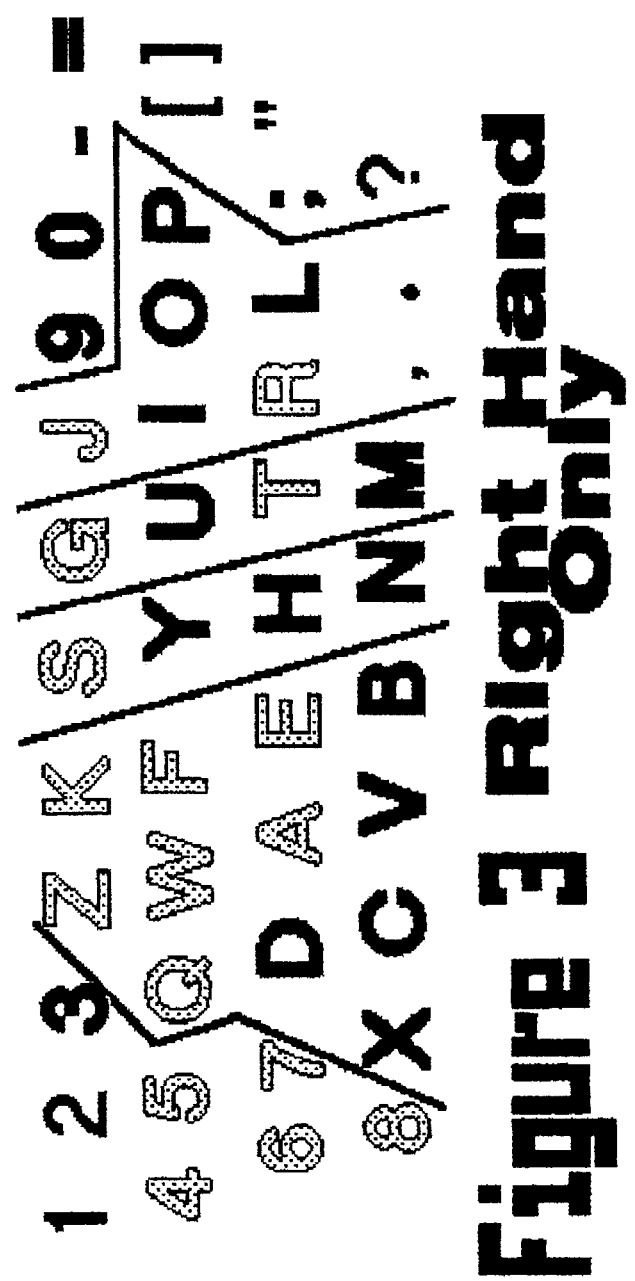
Figure 3 Right Hand Only 1 2 3 K W P Z @ 9 0 - =

4 5 J F G Y U I O 8 [ ]

6 S D R T H E A L ; "

7 X C V B N M , . ?

Left Hand Only

Figure 4

Figure 6 training colors

```
pinky  ring  middle  L.index  R.index  middle ring  pinky
1      2     3 4     5 6      7 8      9 0          - =
Q      W     E D     R T      Y U      I O          P [ ]
A      S     D       F G      H J      K L          ; '
Z      X     C       V B      N M      , .          /
```

KEYBOARD ARRANGEMENT TO MAXIMIZE ONE-HANDED TYPING SPEED AND TRAINING FOR ENGINEERING AND ARCHITECTURAL COMPUTER ASSISTED DRAWING AND DESIGN OR DISABLED TYPISTS

CROSS REFERENCE TO RELATED APPLICATIONS

U.S. Pat. No. 5,352,050, KEYBOARD ARRANGEMENT TO MAXIMIZE TYPING SPEED AND EASE OF TRANSITION FROM A QWERTY KEYBOARD; Application Ser. No. 08/273,205 of Jul. 11, 1994 (CIP of 07/918,767 Jul. 27, 1992); and 08/273,489 of Jul. 11, 1994 (DIV of 07/918,767 Jul. 27, 1992)

Statement as to Rights to inventions made under Federally sponsored research and development: None.

BACKGROUND OF THE INVENTION

The following language from 37 CFR 1.71(e) is adopted:

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

The present invention is directed to improvements in one-handed typing systems, typing training, keyboard arrangement, disability accommodation, medical and physical therapy for repetitive stress syndrome, multi lingual translation, communication, displaying information on video terminals or monitors, word processing, data entry, encryption substitution, psychokinetic, code, computer assisted design, and disabled communication, as well as many other applications.

Writing improvements for one-handed, generally deal with increased speed, rather than with the preservation. For instance, for thousands of years chiseling has made a more permanent writing as compared to drawing on paper, but, chiseling is so cumbersome, low tech, and expensive, it is now generally reserved for office building entrances, or grave markers. You may disagree when events occurred, but the following highlights improvements that have made writing faster. Virtually all communication, until the creation of the keyboard, was one-handed and required no digits, other than necessary to grip the writing tool.

3rd millennium BC: Asians chisel one-handed pictographs into stone with a writing speed of: 5 WORDS AN HOUR.

2nd Millennium B.C.: Chinese or Egyptians invent HIEROGLYPHICS, one-handed writing on stone or metal; (10 Commandments written on stone tablets) and with it, the writing speed doubles to: 10 WORDS AN HOUR.

18th century B.C.: Egyptians discover papyrus, Babylonians use clay, Semites use vellum and these new surfaces allow one-handed writing speed to double to: 20 WORDS AN HOUR.

16th century B.C.: Hebrews inspired to use 22 character alphabet, e.g., writing of the Old Testament right to left on scrolls. Consequently, the one-handed writing speed doubles to: 40 WORDS AN HOUR.

1st millennium B.C.: Greeks refine their alphabet to 24 letters and change writing from left to right, use vegetable stains, blood and mud for dyes and again the one-handed writing speed doubles to: 80 WORDS AN HOUR.

4th century B.C.: Romans develop alphabet of 24 capital letters (Latin), no punctuation or spacing, and pages (early books). With these innovations, the one-handed writing speed doubles to: 160 WORDS AN HOUR.

1st millennium A.D.: Europeans invent punctuation, with small letters and as a result, the one-handed writing speed doubles to: 5 WORDS A MINUTE.

15th century A.D.: Italians, (including Leonardo DaVinci with backwards writing), invent ink, quill, and pen and one-handed writing speed doubles to: 10 WORDS A MINUTE.

2. Description of Related Art

In 1867, a Milwaukee printer, C. Latham Sholes invents the typewriter and with it, invents two-handed writing, and speed doubles to: 20 WORDS A MINUTE. See discussion of Syllabic typewriter, U.S. Pat. No. 3,970,185 issued to Dothan Shelton in 1976.

In 1867 (later, perhaps that same year) a Milwaukee secretary invents "touch typing," and the writing speed DOUBLES to 40 WORDS A MINUTE and jams mechanical typewriters keys and hammers. (See discussion of QWERTY (FIG. 1) in Combinatorial Keyboards which encode Characters and a space, U.S. Pat. No. 4,655,621 issued to Richard Holden in 1987.) High schools and business schools teach what is called the "touch system" of typing. The "touch system" of typing simply means that the typist memorized the keyboard so thoroughly that she can type without looking at it, and that she learns to use all of her fingers, each finger on a particular group of keys. Untrained typists use what is called the "hunt and peck" system. Usually they use only their two forefingers or at most their four best fingers, the forefinger and middle fingers. Actually these typists can learn the keyboard just as well and go just about as fast, but very fast typing is more tiring for them than for the touch typist because the hands have to leap all around the keyboard to reach all the keys with only two or four fingers. See Ill, World Enc.

1872 C. Latham SHOLES designed the "Obsolete" keyboard, also referred to as the "QWERTY" keyboard, to jam fingers, not keys. Today, hundreds of millions of keyboards and people follow QWERTY (FIG. 1) system. See discussion of handicaps of so-called "universal" keyboard below in the discussion of U.S. Pat. No. 2,040,248 issued to A. Dvorak, et al.

The first typewriter keyboard worked with three or four rows of buttons, called "keys". Each key was the size of a thumb nail. All keys can be depressed by the outstretched fingers of the hands of the typist in an arrangement about the width of two hands. All keys were connected to metal rods, which looked like little hammers. When the typist flexed (retracted) a finger, the finger depressed (pushed down) a key. Each of the twenty six alphabet keys were connected to pulleys and springs, which lifted the hammer to strike paper wrapped against a round rubber tube called a "platen." The end of the hammer face had a reverse metal letter or "type face". This type face left an impression on the paper through a piece ribbon (inked cloth). If the typist were quick, two or more hammers could hit at the same time and collide, a process called "jamming". The typist would have to stop work and separate the hammers.

To remedy this jamming, Sholes' keyboard located the most used letters away from the home row, so fingers would reach between keys. The term "home row" is used to indicate the row where the fingers are normally at rest, e.g., "A S D F G H J K L ;" for the "QWERTY" or "obsolete" keyboard. In effect, Sholes jammed fingers instead of keys.

For example, normally for two-handed typing, the middle finger on the left hand rests on the home row key "D". To reach the "E" key on the "obsolete" keyboard, the finger must travel one half inch forward, press the "E" key, and then travel one half inch back to return to the "D" key. A similar journey must be made to type any keys on the top row (Q W E R T Y U I O P) or on the bottom row (Z X C V B N M) of the obsolete keyboard. But, the letter "E" is used more than "D". Thus, having "E" on the top row causes unnecessary flexing. The same applies to the T-R-I-N keys, which are also used much more than their sister keys G-F-K-J. If typists knew that "J" and "K" are the second and fourth least used letters in English, they would be hopping mad.

In 1909, U.S. Pat. No. 943,466 (Type-Writer Keyboard) issued to S. W. Rowell lists features for a one-handed keyboard. Rowell grouped nine of the most often used letters in English (to wit: AEHINORST), accounting for 69% of total letter frequency, together in the center of the Keyboard. Rowell retained the four horizontal row arrangement of the QWERTY (FIG. 1) designed keyboard. However, Rowell relocated all 26 letters of the alphabet from the location of the keys on the QWERTY (FIG. 1) keyboard, that is, none of the letters retained their former positions. Rowell's feature was to put letters in position "to be touched by either or both hands."

In 1920, U.S. Pat. No. 1,336,122 (Keyboard for Typewriters) issued to F. M. M. Banaji lists features for a two-handed keyboard. Banaji retained the four horizontal row arrangement of the QWERTY (FIG. 1) keyboard. However, Banaji relocated 18 letters of the alphabet from the location of the keys on the QWERTY (FIG. 1) keyboard and only 8 letters retained their former positions (to wit: BDEKRTYZ). Banaji chose least used keys on the home row of the keyboard (to wit: FKLQX). Banaji's feature was to relieve pressure on the index fingers (by substituting Q and X for G and H).

In 1920, U.S. Pat. No. 1,342,233 issued to C. Wolcott lists features for a two-handed keyboard. Wolcott retained 4 horizontal row arrangement of the QWERTY (FIG. 1) keyboard. However, Wolcott relocated 24 letters of the alphabet from the location of the keys on the QWERTY (FIG. 1) keyboard and retained only 2 letters in their former positions (to wit: CP). Wolcott selected least used keys on the home row of the keyboard (to wit: BJQUW). Wolcott's feature is the "approximately even division" of "labor between the fight and left hand."

1924 Typewriter Keyboard Arrangement, U.S. Pat. No. 1,506,426 issued to R. E. Hoke lists features for a two-handed keyboard. Hoke retains the 4 horizontal row arrangement of QWERTY (FIG. 1). Hoke relocates all 26 letters of the alphabet from the location of the keys on the QWERTY (FIG. 1) keyboard; none of the letters retain their former positions. Hoke places 9 most used keys on the home row (to wit: AEHIONRST) and selects the vowel "U" for the 10th position. Hoke's features are to place most used keys on home rows, and to place Shift key, Back Spacer, and Shift lock in the vertical middle of the keyboard to be operated by the thumb.

1936 Typewriter Keyboard, U.S. Pat. No. 2,040,248 issued to AUGUST DVORAK et al. lists features for a two-handed and one-handed keyboard. Dvorak introduced a new keyboard "based on the frequency of usage of the letters in the English language." (Of course, so was Sholes's keyboard.) But by the 1930's, the electric typewriter solved the jamming problem of six decades earlier. Dvorak retains the horizontal row arrangement of QWERTY (FIG. 1). Dvorak relocates 23 letters of the 26 letters of the alphabet from their former location on the QWERTY (FIG. 1) keyboard; only 3 letters retain their former positions (to wit: AMZ). Dvorak places 9 most used keys on the home row (to wit: ADEHINOST) and selects the vowel "U" for the 10th position. Dvorak's features are to place most used keys on home rows (or middle bank) for 70% total letter frequency. Dvorak also reduces awkward positions which slow down rhythm and contribute to errors, fatigue, and slowness. He improves typing for digraphs (two letter sequences) and trigraphs (three letter sequences). ADEHINOSTU (Dvorak's Top 10)"U" for "R". Dvorak's frequency list used the vowel "U" for a home key instead of "R".) These ten letters combined have a cumulative percentile frequency in English of 69, in French of 72, in German of 67, in Italian of 69, and in Spanish of 64. The other 16 letters of the alphabet (BCFGJKLMPQRVWXYZ) have a cumulative percentile frequency in English of 31, in French of 28, in German of 33, in Italian of 31, and in Spanish of 26.

It is clear from the above that through the ages there have been a number of ways of transcribing the written word and in this century people have come up with a number of different keyboard arrangements to facilitate the written word. However, many millions of people have learned the "Obsolete" QWERTY (FIG. 1) keyboard. But, would they try a different arrangement? Dvorak changed the location of nearly all of the letters from Sholes's keyboard, and so, most people were not willing to try a totally new keyboard arrangement. Hence, the Dvorak keyboard has been largely ignored.

1937 Keyboard for Typewriters, U.S. Pat. No. 2,080,457 issued to R. Bower, assignor to Burroughs Adding Machine Company, lists features for a two-handed keyboard. Bower retains the 4 horizontal row arrangement of QWERTY (FIG. 1). Bower relocates 24 letters of the alphabet from their former location on the QWERTY (FIG. 1) keyboard; 2 letters retain their former positions (to wit: SH). Bower places 10 most used keys on the home row (to wit: ADEHINORST), for 71% total letter frequency. Bower's improvements reduce awkward positions, avoid rhythm slow down, reduce errors, fatigue, and increase speed. He improves typing for two and three letter combinations.

1940 Electric typewriters allow two-handed speeds to increase to 120 WORDS A MINUTE.

1965 Word Writing Machine Producing closed up printing in response to simultaneous actuation of keys, U.S. Pat. No. 3,225,883 to W. Ayres and lists features for a two-handed keyboard. Ayres abandons the QWERTY (FIG. 1) 4 horizontal row system for a 5 row grouping of double alphabets. The keyboard design allows simultaneous fingering instead of sequential fingering as on a typewriter. It is designed for a shorthand, or stenotype system.

1972 Keyboard for Typewriter, U.S. Pat. No. 3,698,532 issued to I. Dodds lists features for a two-handed keyboard. Dodds adopts a 4 row angular arrangement of keys. Dodds relocates 24 letters of the alphabet from their former location on the QWERTY (FIG. 1) keyboard; 2 letters retain their former positions (to wit: AM). Dodds places the 9 most used keys on the home row (to wit: ADEHIONST) and selects the vowel "U" for the 10th position. The feature of the angle is to eliminate "cramping of the operator's hands, fingers and arms."

1972 Keyboard Arrangement, U.S. Pat. No. 3,698,533 issued to Illig, assigned to Bell Labs, lists features for a fight one-handed keyboard. Illig adopts a 5 row arrangement of keys. Illig relocates 26 letters of the alphabet from their former location on the QWERTY (FIG. 1) keyboard. The vowels are placed on the home row, with remaining letters arranged in order of frequency. The feature is to allow a single hand to operate the board.

1974 English Keyboard Scheme, U.S. Pat. No. 3,847,263 issued to X lists features for a two-handed keyboard. X adopts the horizontal arrangement of QWERTY (FIG. 1). X relocates 24 letters of the alphabet from their former location on the QWERTY (FIG. 1) keyboard; 2 letters retain their former positions (to wit: HX). X places 9 most used keys on the home row (to wit: AEHIONRST) and selects the vowel "U" for the 10th position. The X feature is to place the vowels (AEIOU) on the same side, to be typed by one hand, with consonants on the other side of the home row, to be typed by the other hand.

1976 Syllabic Typewriter, U.S. Pat. No. 3,970,185 issued to D. Shelton lists features for a two-handed keyboard. Shelton selects a 5 row arrangement and relocates all 26 letters of the alphabet from their former location on QWERTY (FIG. 1). The vowels are placed in the lower center to be operated by the thumbs.

1981 Keyboard Arrangement, U.S. Pat. No. 4,244,659 issued to L. Malt lists features for a two-handed keyboard. Malt selects a 5 row arrangement in a curving pattern and relocates all 26 letters of the alphabet from their former location on QWERTY (FIG. 1). The most used keys (to wit: ANISDTHOR) are selected for the home row, and the E key is to be operated by the thumb.

1987 Combinatorial Keyboards Which Encode Characters and a Space, U.S. Pat. No. 4,655,621 issued to R. Holden lists features for a two-handed keyboard. Holden selects a 2 row curved grouping of 18 keys. Holden relocates all 26 letters of the alphabet from their former location on QWERTY (FIG. 1). Holden uses principles of musical bassoon playing to allow the operator to select keys. Holden compares the letter frequency of the alphabet in the following languages: English, French, German, Italian and Spanish. The keyboard features minimal formal instruction, adaptability to other languages written in the Latin alphabet, increased speed, and lower error rate. Holden allows operation by the thenar and hypothenar eminences (heels of the hands).

3. Objects of the Invention

Thus, it is an object of the present invention to provide a keyboard arrangement that has the distinct advantage of maximizing the speed and efficiency for either right one-handed or left one-handed typing while allowing for a smooth and easy transition from the QWERTY (FIG. 1) keyboard arrangement to the keyboard arrangement of the present invention.

Another object of the present invention is to provide a keyboard that increases speed of training of one-handed or two-handed operators by color matching the keys to be reached by a specific finger.

Yet another object of the present invention is to allow disabled, arthritic, and/or limited hand use typists, e.g., the disabled with limited finger movement, to increase their speed and use of the computer keyboard, and to reduce body, head, neck, eye, and sensory stress.

SUMMARY OF THE INVENTION

In accordance with the foregoing objectives, there is provided a computer keyboard having at least four rows of nine or more keys. The first, or bottom, row of the keyboard has at least four of the thirteen least used letters of the alphabet or numbers or punctuation. The second, or home, row of the keyboard has at least four of the ten most used letters of the alphabet from a language which is capable of being written by the QWERTY (FIG. 1) keyboard. The E key is located on this row. The location of the E key will serve as the location for the index finger. The third row of the keyboard has at least three of the thirteen least used letters of the alphabet or any numbers. The fourth row of the keyboard has at least five numbers. The keyboard is also such that at least fourteen and less than 39 of the alpha and numeric and punctuation keys have the same location as on the QWERTY (FIG. 1) keyboard. The layout is adjustable for either right one-handed or left one-handed users.

In another preferred embodiment of the present invention, there is provided a computer keyboard having at least three rows of nine or more keys, whereon the suggested location of the fingers to access each key is marked in color on the key. This requires a minimum of two colors sufficiently distinctive in color, hue, tint, or shade, by which the typist can discern the keys to be depressed by different fingers. Up to ten separate colors could be used to designate eight fingers and two thumbs for a two-handed typist. Up to five separate colors could be used to designate four fingers and thumb for a one-handed typist. Additional colors may be used to designate keys which the typist will not be expected to reach without visual assistance. As an alternative to color matching, the keys could be given different shapes by which the typist can discern the keys to be depressed by different fingers.

The suggested location of the fingers to access each key is marked in color on the key. This requires a minimum of two colors sufficiently distinctive in color, hue, tint, or shade, by which the typist can discern the keys to be depressed by different fingers. Up to ten separate colors could be used to designate eight fingers and two thumbs for a two-handed typist. Up to five separate colors could be used to designate four fingers and thumb for a one-handed typist. Additional colors may be used to designate keys which the typist will not be expected to reach without visual assistance. As an alternative to color matching, the keys could be given different shapes by which the typist can discern the keys to be depressed by different fingers.

In another preferred embodiment of the present invention, there is provided a computer keyboard having at least three rows of nine or more keys, whereon the suggested location of the fingers to access each key is marked with a tactile stimulus so the typist can discern the keys to be depressed by different fingers. This stimulus can be placed on every key, or on the keys suggested for the home placement. This will enable the one-handed typists, or disabled two-handed typists, to locate their fingers without looking at the keyboard.

The suggested location of the fingers to access each key is marked with a tactile stimulus so the typist can discern the keys to be depressed by different fingers. This stimulus can be placed on every key, or on the keys suggested for the home placement. This will enable the one-handed typists, or disabled two-handed typists, to locate their fingers without looking at the keyboard.

BRIEF DESCRIPTION OF THE DRAWINGS

FIG. 1 is a plan view of a prior art QWERTY keyboard.

FIG. 2 is a plan view of a right one-handed keyboard having the most used letters in the English language on the clustered in the middle sectors of each row while maintaining the basic QWERTY format.

FIG. 3 is a plan view of a fight one-handed keyboard similar to FIG. 2 wherein the letters are separated into six groups for color marking for one-handed training.

FIG. 4 is a plan view of a left one-handed keyboard having the most used letters in the English language on the clustered in the middle sectors of each row while maintaining the basic QWERTY format.

FIG. 6 is a plan view of a keyboard similar to FIG. 1 wherein the letters, numbers and punctuation are separated into eight groups for color marking for two-handed training.

DETAILED DESCRIPTION OF THE INVENTION

Figure 5:
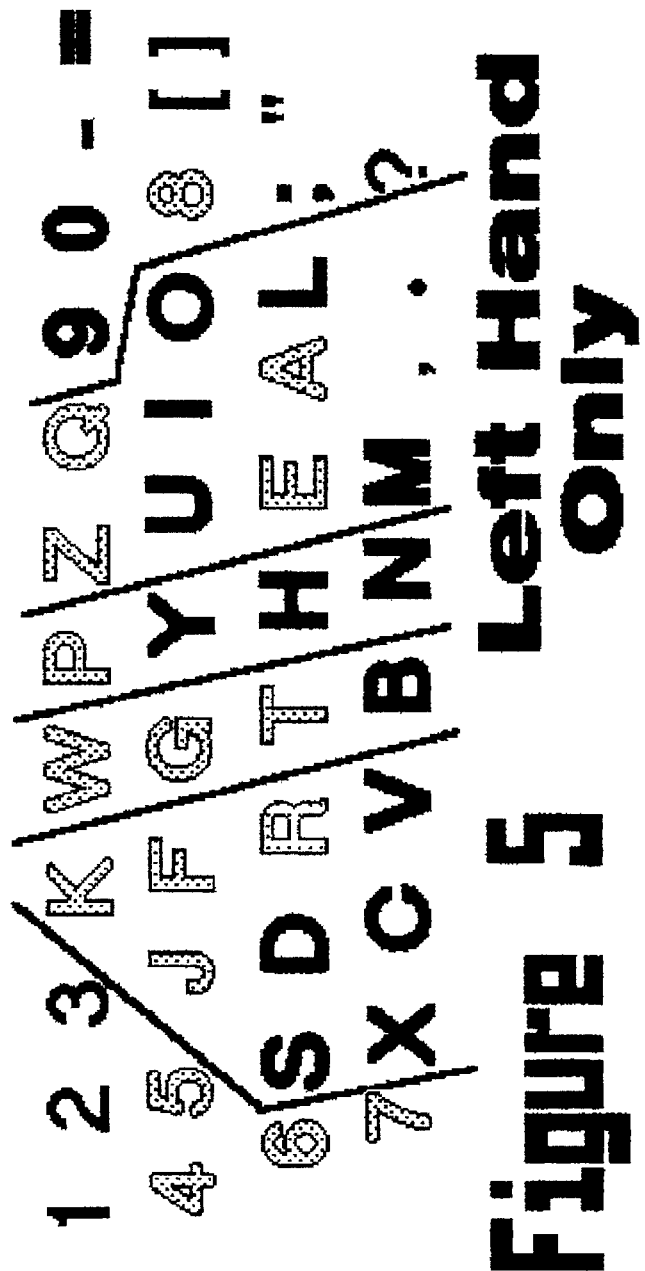
FIG. 5 is a plan view of a left one-handed keyboard similar to FIG. 4 wherein the letters are separated into six groups for color marking for one-handed training.

FIG. 2: Right Hand Only. Bottom Row: Numeral, XCVBNM, punctuation. Second Row: Numerals, DAEHTRL, punctuation. Third Row: Numerals, QWFJYUIOP, punctuation. Fourth Row: Numerals, ZKSGJ, numerals, punctuation. (The letters THEORDINALS are the 11 most frequently used letters in American English.) These eleven letters are clustered in the middle of the rows, for easier access by a one-handed typists. The combined letters have a cumulative percentile frequency in English of 78. The other 15 letters of the alphabet (BCFGJKMPQUVWXYZ) have a cumulative percentile frequency in English of 22. The location of the E key will serve as the location for the right index finger. The EHTR keys will received such physical shape so as to give a specific tactile sensation feel to the user, to enable the fingers to locate and remember to return to their home positions.

FIG. 3: Right Hand Only markings. The Right index finger will home on the E. The keyboard layout will give a single color to the keys which the right index finger will depress, to wit: XCVB (1st row), DAE (2nd row), QWF (3rd row), and ZK (4th row). The keyboard layout will give a single color to the keys which the right middle finger will depress, to wit: N (1st row), H (2nd row), Y (3rd row), and S (4th row). The keyboard layout will give a single color to the keys which the right ring finger will depress, to wit: M (1st row), T (2nd row), U (3rd row), and G (4th row). The keyboard layout will give a single color to the keys which the right pinky finger will depress, to wit: comma, period, (1st row), RL (2nd row), IOP (3rd row), and J (4th row). The coloring to designate each adjacent finger shall be a distinctive color or pattern to separate the recognition between the fingers. Or, in other words, don't use the same color for fingers that are next to each other. FIG. 4: Left Hand Only. Bottom Row: Numeral, XCVBNM, punctuation. Second Row: Numerals, SDRTHEAL, punctuation. Third Row: Numerals, JFGYUIO, numeral and punctuation. Fourth Row: Numerals, KWPZQ, numerals, punctuation. (The letters THEORDINALS are the 11 most frequently used letters in American English.) These eleven letters are clustered in the middle of the rows, for easier access by a one-handed typists. The combined letters have a cumulative percentile frequency in English of 78. The other 15 letters of the alphabet (BCFGJKMPQUVWXYZ) have a cumulative percentile frequency in English of 22. The location of the E key will serve as the location for the left index finger. The EHTR keys will received such physical shape so as to give a specific tactile sensation feel to the user, to enable the fingers to locate and remember to return to their home positions.

FIG. 5: Left Hand Only markings. The Left index finger will home on the E. The keyboard layout will give a single color to the keys which the left index finger will depress, to wit: M, comma, period (1st row), EAL (2nd row), UIO (3rd row), and ZQ (4th row). The keyboard layout will give a single color to the keys which the Left middle finger will depress, to wit: N (1st row), H (2nd row), Y (3rd row), and P (4th row). The keyboard layout will give a single color to the keys which the left ring finger will depress, to wit: B (1st row), T (2nd row), G (3rd row), and W (4th row). The keyboard layout will give a single color to the keys which the left pinky finger will depress, to wit: XCV (1st row), SDR (2nd row), JF (3rd row), and K (4th row). The coloring to designate each adjacent finger shall be a distinctive color or pattern to separate the recognition between the fingers.

Figure 6:
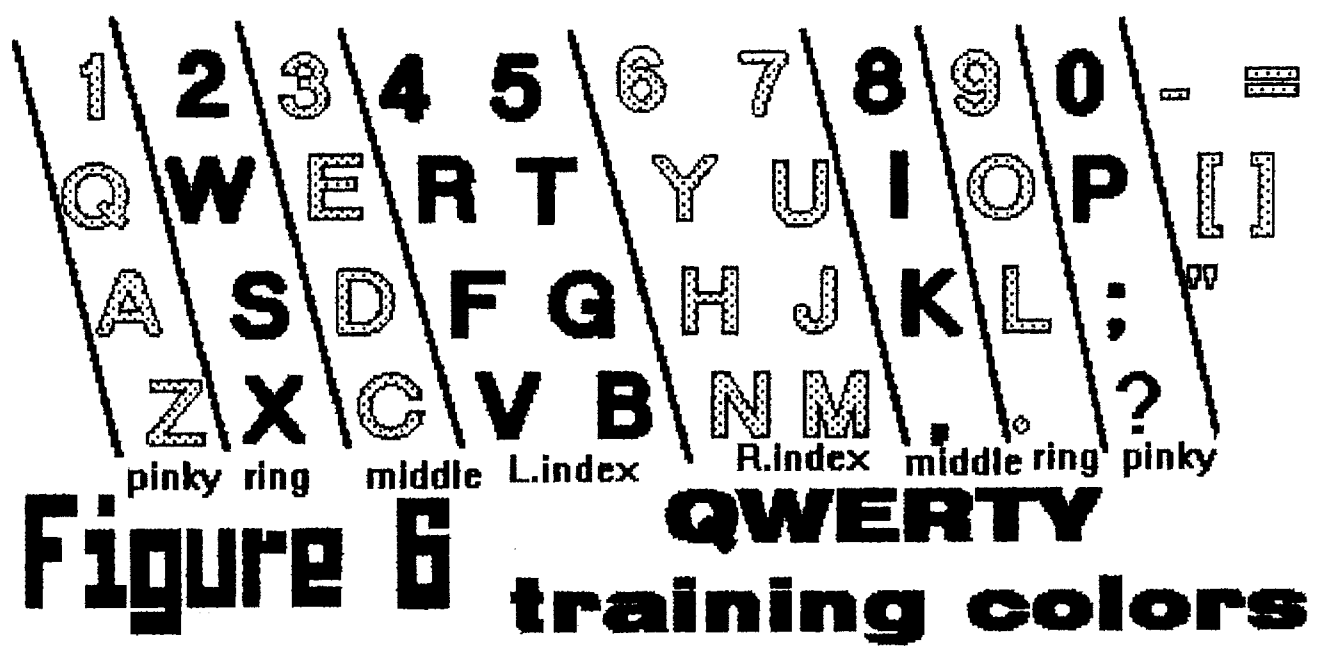

FIG. 6: QWERTY training coloring markings. The Left index finger will home on the F. The keyboard layout will give a single color to the keys which the left index finger will depress, to wit: VB (1st row), FG (2nd row), RT (3rd row), and 45 (4th row); the keyboard layout will give a single color to the keys which the Left middle finger will depress, to wit: C (1st row), D (2nd row), E (3rd row), and 3 (4th row); the keyboard layout will give a single color to the keys which the left ring finger will depress, to wit: X (1st row), S (2nd row), W (3rd row), and 2 (4th row); the keyboard layout will give a single color to the keys which the left pinky finger will depress, to wit: Z (1st row), A (2nd row), Q (3rd row), and 1 (4th row). The Right index finger will home on the J. The keyboard layout will give a single color to the keys which the right index finger will depress, to wit: NM (1st row), HJ (2nd row), YU (3rd row), and 67 (4th row); the keyboard layout will give a single color to the keys which the right middle finger will depress, to wit: comma (1st row), k (2nd row), I (3rd row), and 8 (4th row); the keyboard layout will give a single color to the keys which the right ring finger will depress, to wit: period (1st row), L (2nd row), 0 (3rd row), and 8 (4th row); the keyboard layout will give a single color to the keys which the fight pinky finger will depress, to wit: question mark (1st row), semi colon (2nd row), P (3rd row), and zero (4th row). The coloring to designate each adjacent finger shall be a distinctive color or pattern to separate the recognition between the fingers.

DESCRIPTION OF THE PREFERRED EMBODIMENT

It will also be appreciated that the above lists are merely exemplary of a number of the keyboard arrangements according to the present invention. Thus, the above lists are meant as samples of arrangements according to the present invention and are not meant to limit the scope of the many arrangements that are contemplated by the present invention.

Twenty years ago, the following was written: "One of the most important things about a typewriter is the arrangement of the letters on the keyboard. A typist becomes used to a certain arrangement, and if different machines had different arrangements it would be hard to use more than one particular make of machine. Yet in the early days there were many different arrangements. Gradually these came down to two popular ones, called the 'universal' and the '[obsolete].' Finally the '[obsolete]' keyboard was adopted by all manufacturers."

"The [obsolete] keyboard arrangement is:

|          |                |
|----------|----------------|
|          | 1 2 3 4 5 6 7 8 9 0 |
|          | Q W E R T Y U I O P |
| Home Row | A S D F G H J K L ; |
|          | Z X C V B N M , .   |

"The problem in designing a typewriter keyboard is this: Some letters of the English language are used more often than others, and some combinations of letters are used more often than others. The keyboard should place the most-used letters where they are easiest to reach with the fingers, but it should separate the letters of the most-used combinations. For example, the combination TH is used a great deal (in such words as the, that, than, this, thing, and so on) while the combination TQ is never used. If the T key and the H key were too close together, the type bar for H would always be striking the type bar for T."

"Sholes, the inventor, worked out the [obsolete] keyboard. It prevents most clashes between type bars, but in other ways it is very poor. The forefinger and middle finger of the hand are the ones we can use best, and the most-used letters should be where these fingers can reach them most easily, but on the [obsolete] keyboard many of the most-used letters are at the sides where they are within easy reach of the little finger but not of the middle fingers."

"Many people have worked out better keyboard arrangements, but so many millions of people have learned the [obsolete] keyboard that it would cause them a great deal of trouble if the arrangement were changed." Source: *Illustrated World Encyclopedia*, Vol 14, 1970, Glen Cove, N.Y., p. 4694 et seq.

"Carpal Tunnel syndrome" refers to the compression of the median nerve (due to inflammation of flexor retinaculum, arthritis, or tenosynovitis) as it passes through the osteofibrous carpal tunnel along with the tendons of the long digital muscles which typically results in paresthesia (tingling), anesthesia (loss of tactile sensation), or hypesthesia (diminished sensation) in skin areas related to the thumb, index, middle, and lateral 1/2 of ring fingers. The palm may be saved due to palmar cutaneous branch arising superficial to flexor retinaculum. A progressive loss of strength and coordination in thumb with diminished use of thumb, index, and middle fingers as nerve is compressed is also common. Carpal Tunnel syndrome is relieved by partial or complete division of the flexor retinaculum."

Finger numbers—left hand little (1), ring (2), middle (3), index (4); right hand index (5), middle (6), ring (7), and little (8).

Cumulative frequency refers to the most used letters, i.e., the letters used most often, in a particular language such as English, Spanish, German, French, Italian, etc. This is a important methodology in cryptography (i.e. decoding messages).

The frequency of single letters in the English language, in descending order, according to Laurence Dwight Smith, *Cryptography*, 1943, New York, Dover Publications is as follows: "E,T,O,A,N,I,R,S,H,D,L,C,W,U,M,F,Y,G,P,B,V,K, X,Q, J and Z. The frequency of single letters in newspaper English language, in descending order, from Donald Milliken, *Elementary Cryptography and Cryptanalysis*, 1942, New York University Bookstore is as follows: E, T, N, R, O, I, A, S, D, H, L, C, F, U, P, M, Y, G, W, V, B, X, K, Q, J and Z. More specifically, the percentages were as follows: E-13%, T-9.3%, N-7.8%, R-7.7%, O-7.4%, I-7.4%, A-7.3%, S-6.3%, D-4.4%, H-3.5%, L-3.5%, C-3.0%, F-2.8%, U-2.7%, P-2.7%, M-2.5%, Y-1.9%, G-1.6%, W-1.6%, V-1.3%, B-0.9%, X-0.5%, K-0.3%, Q-0.3%, J-0.2%, and Z-0.1%.

Thus, by relocating keys so as to maximize frequency around the home row, one can achieve a cumulative frequency of upwards of 80% or more depending upon the particular words that are employed. In fact, it will be appreciated that if desired, one could use only the home row keys and still communicate effectively thereby achieving a home row cumulative frequency of 100%. For example, one technique frequently employed for encryption is to use only a select number of letters, e.g., 10, as the entire alphabet. Accordingly, by the term "a cumulative frequency of about 80% (or 40%)" it is not meant to refer strictly to 80% (or 40%), per se, but rather 80% (or 40%) for the "normal usage" of the full alphabet, e.g., 26 letters for English, French, Spanish, etc. However, it is also understood that this percentage can be varied as desired by, e.g., usage of fewer than the full alphabet or through a particular word selection.

High frequency keys refers to those letters of the alphabet used most in normal usage of a language. These letters provide cryptographers with clues for decoding secret messages.

Home Row—the keys on the second row of keys (also the resting place of the fingertips of the two hands, index, middle, ring, and little fingers).

"jam v. t. [jammed, jam'ming] 1, thrust or squeeze in so as to stick fast; crowd so as to hinder motion or extrication. - v. i. 1, become wedged in place." WEBSTER HANDY College DICTIONARY, 1981.

Low Frequency keys—The letters of the alphabet that are little used.

"ob'so-lete" adj. gone out of use; out of date." WEBSTER HANDY College DICTIONARY, 1981. aka QWERTY (FIG. 1) keyboard.

Psychokinetic—the typist has memorized the keyboard so thoroughly as to type without looking at the board, usually using all fingers, each finger on a particular group of keys.

QWERTY (FIG. 1)—a nickname name given to C. Latham Sholes "standard" keyboard; it is an anagram from the first six letters of the top alphabet row. It is the "slow" board, because slowness prevented the type bars from clashing, and that was good in 1872. It is the "weary" board, because these wasted motions weary the fingers and arms of typists. It is now the "obsolete" or "primitive" keyboard, because its purpose has passed.

Row means a horizontal row or bank of keys on the keyboard, between nine and fifteen in number, each row arranged in parallel.

"stan'dard, n. 1, a basis of comparison; a criterion; measure." WEBSTER HANDY College DICTIONARY, 1981. aka QWERTY (FIG. 1) Keyboard.

Universal keyboard—aka QWERTY (FIG. 1).

In a particularly preferred embodiment of the present invention, seventeen keys are moved from the "obsolete" keyboard to create the "Right Hand" (FIG. 2) keyboard. The moved keys are: A-E-F-G-J-K-Q-R-S-T-W-Z and 4-5-6-7-8. E, R, T, formerly on the third row of the "obsolete" keyboard, are letters most used and should be placed on the home row, where they can be typed easily. In order to place the useful letters on the home row, F, G, J, K, were swapped with the most used keys. This results in the "Right Hand Only" (FIG. 2) keyboard.

The letters E-I-O-N-R-T, (listed alphabetically) are the highest frequency letters in Modern English. They make up about 50 percent of our words. All of these are accessed by a stationary one hand according to one preferred embodiment of the present invention. (FIG. 2, 3, 4, 5). Whereas they can be depressed only with difficulty on the QWERTY (FIG. 1) keyboard.

According to some books on codes, to wit: *All Kinds of Codes*, by Babson, N.Y.: Four Winds Press, 1976, p. 54–607; *Cryptography*, by Laurence Dwight Smith, 1943, New York, Dover Publications; *Elementary Cryptography and Cryptanalysis*, by Donald D. Milliken, New York University Bookstore, 1942 we learn the following:

On the average, in written English, "E" shows up about 13 percent of the time; "T"—nine percent; "O"—eight percent; "N"—seven percent; "R" and "T"—six and a half percent each. (All of these may be on the home row of the keyboard according to the present invention. None are on the Obsolete keyboard home row.)

The most often used two-letter English words (with the "As In Red Hot" (FIG. 2) finger assignments) are: AS(12), AT(16), BE(44), BY(45), DO(35), HE(54), IN(47), IS(42), IT(46), OF(53), ON(57), OR(58), SO(25), and TO(65). (Up to at least 11 of the 14 may be on the home row of the keyboard according to the present invention. That is, 11 of these words can be spelled solely from the letters of the home row. Only 1 is on the QWERTY (FIG. 1) keyboard home row.) Most often used of these two-letter words are: OF(53), TO(65), IN(47). (Up to at least 2 of the 3 may be on the home row of the keyboard of the present invention. None are on the QWERTY (FIG. 1) keyboard home row.)

The most often used three-letter English words (with the "As In Red Hot" (FIG. 2) finger assignments) are: ALL (155), AND(173), ANY(175), ARE(184), BUT(456), CAN (317), FOR(358), NOT(756), THE(654), and YOU(555). (Up to at least 4 of the 10 may be on the home row of the keyboard of this invention. Only 1 is on the QWERTY (FIG. 1) home row.) Most often used of these are AND THE. (Both may be on the home row of the keyboard of this invention. Neither are on the QWERTY (FIG. 1) keyboard home row.)

Every English word has at least one of these letters: A-E-I-O-U-Y. (Up to at least 4 of the 6 may be on the home row of the keyboard of this invention. Only 1 is on the QWERTY (FIG. 1) keyboard home row.)

Over half of our English words begin with: A-C-H-O-S-T-W. (Up to at least 5 of the 7 may be on the home row of the keyboard of this invention. Only 3 are on the QWERTY (FIG. 1) keyboard home row.) T, the most common beginning letter, may be on the home row of the keyboard of this invention, but it is not on the QWERTY (FIG. 1) keyboard home row.)

One Hand Typing

The present invention has as an advantage the reduction of the human cost of the 1872 technology currently employed in most keyboards. The obsolete keyboard can even create an occupational hazard known as repetitive stress disorder. One manifestation is a medical disability termed "Carpal Tunnel Syndrome," which is a wrist injury.

Thus, an additional advantage of the present invention is the protection of the carpals from stress injury. The carpals are 8 wrist bones. There are 17 tendons in the wrist. Tenosynovitis is an inflammation of the tendon sheaths. There are 9 major nerves, arteries and veins in the wrist. There are also several sheaths and ligaments in the wrist. By reducing the amount of stress and work that the fingers, hands, wrists, etc. must perform during typing, the present invention can drastically reduce the incidence of injury associated with typing using the QWERTY (FIG. 1) keyboard.

Additionally, the present invention also has the advantage of rearranging the training keyboard to accommodate the disabled or one handed typist, who should want a home row of the 6 most used keys, that is E, T, N, R, O and I available to the hand.

Medical Conditions Leading to One Hand Typing

Question: What disabled users will be helped? Finger Relief Reg. TM Pend. cannot restore nerve or tissue function. Finger Relief (Reg TM Pending) can reduce extension and flexion, which may be therapeutic). Definitions and descriptions are from *Blakiston's New Gould Medical Dictionary*, copr. 1890–1956, McGraw-Hill Book Company, Inc. New York, Toronto, London; Editors Normand Hoerr, M.D., Arthur Osol, Ph.D. and 88 contributors.

Causes and sources, or associated metabolic and non-metabolic conditions of CTS listed in "When to suspect—and how to make the diagnosis: Carpal Tunnel Syndrome." Consultant, December, 1993, Vol. 33; No. 12; Pg. 413; By McCue, Frank C., Mayer, Vi A. Copr. Cliggott Publishing Company 1993. Cited as "When to suspect (CTS)" in Consultant 33:12:40.

Causes of CTS listed in "Carpal tunnel syndrome: a practical review; includes patient information sheet." American Family Physician May 1, 1994 Vol. 49; No. 6; Pg. 1371; by: Richard T. Katz. Copr. 1994 American Academy of Family Physicians. Cause of CTS cited in "(CTS) review" in American Family Physician 49:6:1371.

Aberrant anatomy (L. aberrare, to wander from). Varying or deviating from normal in form. Cause of CTS cited in "(CTS) review" in American Family Physician 49:6:1371.

Amyloidosis (G. amylon, pertaining to starch; eidos G. condition). Widespread deposit of amyloin, a complex protein deposited in tissues, of a hyaline structureless nature. It stains brown. Amyloid results from degeneration of tissue and infiltration of unknown substances. Blakiston's New Gould Medical Dictionary. Cause of CTS listed in "When to suspect (CTS)" in Consultant 33:12:40; and "(CTS) review" in American Family Physician 49:6:1371.

Acromegaly (G. akros, extremity, megas, great). Chronic condition from hyperfunction and hyperplasia of the eosinophilic cells of the adenohypophysis; features are increase size viscera (splanchnomegaly), the soft parts, and bones, especially short and flat bones (acromegaly) without increase in height; hands, feet, and face show most change; metabolic disturbance, change in sugar tolerance, and secondary changes in other endocrine organs. Blakiston's New Gould Medical Dictionary. Cause of CTS cited in "(CTS) review" in American Family Physician 49:6:1371.

Acrosclerosis (G. akron, extremity, G. sklerosis, hardening). Scleroderma affecting the hands and extending to the upper extremities and the face; seen usually as a sequel of Raynaud's syndrome. FIG. 281, 464. Blakiston's New Gould Medical Dictionary.

Apoplexy (G. apoplexia, to cripple by a stroke). The symptom complex resulting from hemorrhage into or upon the brain, or from embolism or thrombosis of the cerebral vessels, consisting of sudden onset of coma, and focal neurological signs. Bulbar apoplexy—due to hemorrhage into the substance of the medulla oblongata or pons, causing paralysis of one on both sides of the body, inability to swallow, difficulty in protruding the tongue, dyspnea, gastric disorders, and disturbed heart action. Sanguineous apoplexy. Hemorrhage into on upon the brain; true apoplexy. Blakiston's New Gould Medical Dictionary.

Artery—Persistent/thrombosed median artery (G. thrombos, lump). Thrombus is a clot of blood formed within blood vessel, due usually to a slowing of the circulation or alteration of the blood or vessel walls. Blakiston's New Gould Medical Dictionary. The median artery parallels the median nerve through the carpal tunnel. Cause of CTS cited in "(CTS) review" in American Family Physician 49:6:1371.

Arthritis or wrist malalignment (G. arthron, joint; itis, inflammation). Inflammation of joints—Significance: There are Sixty (60) joints in the 2 hands. FIG. 201, 202. Acromegalic arthritis—A degenerative disease of the joints due to acromegaly. Arthritis of rheumatic fever—Acute, reversible, migratory synovitis of short duration occurring during exacerbations of rheumatic fever. Gonorrheal arthritis—A specific, blood-borne, gonococcal infection in joint tissue. May be mild and transient, or severe, becoming purulent and leading to bony ankylosis. Gouty arthritis—Sudden severe, painful attacks, often at night, complete recovery or repeated attacks with degenerative joint disease. Heberden's arthritis—Degenerative joint disease of the terminal joints of the fingers, producing enlargement and flexion deformities. Most common in women, occurring idiopathically and as a result of heredity. May result from trauma. Hematogenous Arthritis—An arthritis presumably caused by blood borne pneumococcus on gonococcus infection. Hemophilic Arthritis—Inflammation due to blood in the joint of a hemophiliac. Repeated episodes lead to thickening of the synovial tissues and finally to degenerative joint disease. Menopausal arthritis—Degenerative joint disease, an arthralgia without objective or roentgenographic evidence of disease, occurs in women at menopause. Neurotrophic arthritis—trophic disease of joints, seen in tabes dorsalis, leprosy, syringomyelia, and other disease of the nervous system. There is marked enlargement and disorganization of joint structures and hypermotility, usually painless, also called neuropathic arthritis and Charcot's arthritis. Rheumatoid arthritis—chronic arthritis of unknown etiology, affects multiple joints, producing constitutional effects such as debility, weakness, loss of weight; specific lesion is a proliferation of granulation or connective tissue in synovial and periarticular tissues over the joint surfaces and in subchondral spaces; pain, limitation of motion, deformity, bony ankylosis, also called atrophic arthritis, chronic infectious arthritis, proliferative arthritis. Scarlatinal arthritis—scarlet fever epidemics, usually appearing after 10 days with redness, pain, swelling of the wrists, hands FIG. 281, 464, elbows FIG. 200, and knees due to synovial distention, also called scarlatinal synovitis. Syphilitic arthritis—painful and swollen joints due to syphilis, during secondary stage or gumma of the joint, symmetrical synovitis associated with prenatal syphilis. Blakiston's New Gould Medical Dictionary. Cause of CTS cited in "(CTS) review" in American Family Physician 49:6:1371.

Brachialgia (L. brachium, arm; G. algos, pain). Severe pain in arm or brachial plexus. Blakiston's New Gould Medical Dictionary.

Burn victims—loss of movement in fingers and hands, due to scarring.

Calcium deposits (L. calx, lime). Calcium is a brilliant, silver white metal, with a strong affinity for oxygen. Blakiston's New Gould Medical Dictionary. Cause of CTS cited in "(CTS) review" in American Family Physician 49:6:1371.

Canal congenitally small (L. congenitus, born together with, existing at birth). The carpal canal is the space beneath the flexor retinaculum of the wrist and above the volar aspect of the carpal bones, and transmits the tendons of the long flexor muscles and medial nerve. Cause of CTS cited in "(CTS) review" in American Family Physician 49:6:1371.

Canal volume decreased Cause of CTS cited in "(CTS) review" in American Family Physician 49:6:1371.

Canal volume increased Cause of CTS cited in "(CTS) review" in American Family Physician 49:6:1371.

Cardiac failure—see heart failure.

Carpal Tunnel Syndrome (G. karpos, wrist). Pressure on the median nerve in wrist to cause tingling or numbness in fingers, usually III, IV, and V. Surgical solutions include cutting the Ligament Carpal Dorsale (Transverse Carpal Ligament.) Blakiston's New Gould Medical Dictionary.

Cerebral palsy—See palsy.

Cervical radiculopathy (L. cervix, neck; radicula, small root; pathos, disease). Disease of the roots of the spinal nerves in the neck. Blakiston's New Gould Medical Dictionary. Cause of CTS cited in "(CTS) review" in American Family Physician 49:6:1371.

Diabetes (G. diabetes, from diabainein, to pass through)—A disease characterized by the habitual discharge of an excessive quantity of urine and by excessive thirst. Diabetes mellitus. An inheritable, constitutional disease of unknown cause, characterized by the failure of the body tissues to oxidize carbohydrate at a normal rate. The metabolic disturbance, which has as its most important factor a deficiency of insulin, manifests itself in an excess of sugar in the blood (hyperglycemia), presence of sugar in the urine (glycosuria), and in more advanced stages, acidosis (ketosis) and coma, with symptoms of intense thirst and hunger, weakness, and loss of weight. The disease may be further attended in later life by degenerative changes such as arteriosclerosis, cataract, neuritis. Blakiston's New Gould Medical Dictionary. Cause of CTS listed in "When to suspect (CTS)" in Consultant 33:12:40.

Edema (G. oidema, swelling) Dropsy, excessive accumulation of fluid in the tissue space, due to change in the mechanisms of fluid exchange. There may be a decrease of osmotic pressure of the plasma from reduction in protein concentration, increased hydrostatic pressure in the capillaries due to cardiac failure, increased permeability of the capillary walls from injury or inflammation, or there may be obstruction of the lymph channels. Blakiston's New Gould Medical Dictionary. Cause of CTS cited in "(CTS) review" in American Family Physician 49:6:1371.

Epicondylitis (G.epi, on, upon; kondylos, knuckle; iris, inflammation). Inflammation of an epicondyle, specifically, that of the humerus; often applied to synovitis of the radiohumeral articulation. Also called radiohumeral bursitis, radiohumeral epicondylitis. Blakiston's New Gould Medical Dictionary.

Finger (AS. digit of hand). Baseball finger—luxation of distal phalanx with rupture of distal portion of extensor tendon, resulting in drop of phalanx, caused by baseball injury. Clubbed finger—terminal phalanx is short and broad with overhanging nail, seen in pulmonary and cardiac disease, also called Hippocratic finger, chronic hypertrophic pulmonary osteoarthropathy, drumstick finger. Hammer finger—congenital flexion deformity, usually of middle phalanx of middle finger. Lock finger—Peculiar affection of the fingers in which they become fixed in flexed position, due to presence of small fibrous growth in the sheath of the flexor tendon. Mallet Finger—deformity marked by undue flexion of last phalanx. Seal Finger—Infection in Norway believed to be contracted from seals, characterized by glistening appearance of swollen finger. Spider finger—abnormally long, also called arachnodactyly, Marfan's syndrome, dolichostenomelia. Springfinger—Obstruction to flexion and extension of one or more fingers, due to injury or inflammation of tendinous sheaths. Trigger finger—the flexion or extension of a finger is first obstructed, but finally accomplished with a jerk or sweep, due to chronic tenosynovitis. Webbed fingers—Union of adjacent fingers by interdigital tissue, fingers fused at the lateral aspects, also called syndactyly. Blakiston's New Gould Medical Dictionary.

Flexor superficialis muscle, Distal extension of the. (L. Distare, to be distant) Cause of CTS listed in "(CTS) review" in American Family Physician 49:6:1371.

Fracture (Acute) or callus from healing fracture (L. callus). An area of hardened and thickened skin, as a hypertropyhic reaction of the epidermis to pressure and friction. New growth of incompletely organized bony tissue surrounding the bone ends in fracture, a part of the reparative process. Blakiston's New Gould Medical Dictionary. Non-metabolic disorder associated with CTS listed in "When to suspect (CTS)" in Consultant 33:12:40; and "(CTS) review" in American Family Physician 49:6:1371.

Ganglion (G. gagglion, encysted tumor on a tendon). Benign tumor. A cystic tumorlike localized lesion in a tendon sheath or joint capsule, especially the wrist. It is composed of stellate cells in a matrix of mucoid hyaluronic acid and reticular fibers. Also called cystic tumor of tendon sheath, cyst of joint capsule, cyst of semi-lunar cartilage, weeping sinew. Blakiston's New Gould Medical Dictionary. Non-metabolic disorder associated with CTS listed in "When to suspect (CTS)" in Consultant 33:12:40.

Gout (OF Goute from L. gutta, drop)—constitutional hereditary condition of uric acid metabolism, associated with high blood level and decreased urinary excretion of uric acid often with fever and leukocytosis; sudden attack of acute, painful arthritis, at irregular interval, with remission between attacks. Usually one joint, great toe most common. Tophaceous gout—Condition associated with deposits of sodium urate (tophi) in the skin over the cartilage of the ear and about the fingernails and in the cartilage of the joints. Remember Sixty (60) joints in hands, FIG. 201, 202. Blakiston's New Gould Medical Dictionary. Metabolic condition associated with CTS listed in "When to suspect (CTS)" in Consultant 33:12:40.

Gouty tophus—See Gout. Cause of CTS listed in "(CTS) review" in American Family Physician 49:6:1371.

Heart failure, congestive (L. congestio, from congere, to heap up). An abnormal collection of blood in a part or organ, hyperemia. The syndrome resulting from failure of heart as a pump. Also called Backward cardiac failure, due to the inability of the heart to pump out the blood being returned to it by the veins. Blakiston's New Gould Medical Dictionary. Cause of CTS listed in "(CTS) review" in American Family Physician 49:6:1371.

Hematoma (G. haima, blood) A focalized extravasation of blood, which soon clots to form a solid mass and readily becomes encapsulated by connective tissue, of a size to be a visible, tumorlike swelling, due to traumatic injury or other rupture of blood vessel. Blakiston's New Gould Medical Dictionary. Cause of CTS listed in "(CTS) review" in American Family Physician 49:6:1371.

Hypertension (G. hyper, beyond, above, over; L. tensio, a stretching). Excessive tension, usually with high blood pressure. Blakiston's New Gould Medical Dictionary. Non-metabolic disorder associated with CTS, as listed in "When to suspect (CTS)" in Consultant 33:12:40.

Hypothyroidism (G. hypo, under; G. thyreoeides, shield-shaped). A morbid condition due to deficiency of thyroid hormone, in advanced form expressed as cretinism or myxedema. Blakiston's New Gould Medical Dictionary. Cause of CTS listed in "(CTS) review" in American Family Physician 49:6:1371.

Lipoma (G. lipos, fat; oma, tumor). A tumor, which in the gross is obviously fatty; microscopically composed of fat cells, usually of mature form but occasionally in part or wholly of embryonal type. Cause of CTS listed in "(CTS) review" in American Family Physician 49:6:1371.

Malignant tumors (L. malignus, wicked, malignant) Virulent, threatening life. Cause of CTS listed in "(CTS) review" in American Family Physician 49:6:1371.

Mass lesion (G. maza, barley cake, L. laesio, a hurting). Morphological alteration due to injury. Cause of CTS listed in "(CTS) review" in American Family Physician 49:6:1371.

Menopause. (G. men, month; G. pausis, a stopping). The physiologic cessation of menstruation, usually between 45th and 50th years. Metabolic condition associated with CTS listed in "When to suspect (CTS)" in Consultant 33:12:40.

Muscular Dystrophy—(dys—G. hard, bad, unlucky, trophe G. nourishment). A progressive familial hereditary disorder, marked by atrophy and stiffness of the muscles, and observed when voluntary action is first attempted. Also called dystrophia myotonica, myotonic dystrophy, myotonia dystrophica, Steinert's disease. Loss of movement in fingers and hands FIG. 202, 281, 464. Blakiston's New Gould Medical Dictionary.

Myeloma, multiple (G. myelos, bone; oma, tumor). Kahler's disease. A primary malignant tumor of bone marrow, composed of tumor cells, which are uniform, small and superficially resemble plasmacytes, or dominated by variegated, large cells. Characterized by diffuse osteoporosis or areas of bone destruction often resulting in pathologic fractures and bone pain, by anemia, hyperglobulinemia, the finding of Bence-Jones protein, hypercalcemia, and increased number of cells resembling immature plasmacytes in bone marrow. Also called erythroid m., heroic m., lymphocytic or lymphold m., myeloid m., plasma cell m., plasmacytic or plasmocytic m., plasmacytoma, plasmocytoma, plasmona, plasmacytic or plasmocytic sarcoma, myelocytic sarcoma, or myeloid tumor. Cause of CTS listed in "(CTS) review" in American Family Physician 49:6:1371.

Nerve with minimal compression (double crush)—Cause of CTS listed in "(CTS) review" in American Family Physician 49:6:1371.

Obesity (L. obesitae, fatness). Weight excess, due to accumulation of fat, beyond 10 to 20 percent of normal range for particular age, sex and height. Metabolic condition associated with CTS listed in "When to suspect (CTS)" in Consultant 33:12:40.

Osteoarthritis. (L. osteon, bone; inflammation). Degenerative joint disease. Cause of CTS listed in "When to suspect (CTS)" in Consultant 33:12:40.

Osteoporosis (G. Osteon, bone; G. poros, passage; osis, condition). Enlargement of the marrow and Haversian spaces of the bone at the expense of the solid parts. Trabeculae become fewer and thinner; compact bone tends to resemble cancellous, with resulting fragility. Disuse Osteoporosis—Demineralization with loss of matrix, involving the bones of all on a part of an extremity in which function has been impaired, or the entire skeleton when total physical activity is limited. Senility, menopause, and systemic disease are predisposing conditions. Malnutrition Osteoporosis—That resulting from negative mineral and nitrogen balances and deficiencies of vitamins essential for maintenance of proper calcium and phosphorus distribution in the body and for ossification. Postmenopausal Osteoporosis—A diffuse osteoporosis, often severe, chiefly involving the spine and pelvis, which may follow artificial or physiological menopause, and is caused by the hormonal deficiency and concomitant inadequate bone formation. Senile Osteoporosis—Osteoporosis in the aged, due to deficient osteoid formation. Blood calcium, phosphorus, and phosphatase levels are all normal or low. Blakiston's New Gould Medical Dictionary. Remember Osteoporosis is cause for 200,000 wrist fractures a year, in U.S., mostly in women, FIG. 201, per Newsday/Times Mirror, Nov. 29, 1994)

Palmaris longus tendon, abnormal (L. palm, palm). Two muscles, palmaris longus and palmaris brevis, are inserted into the fascia of the palm. Cause of CTS listed in "(CTS) review" in American Family Physician 49:6:1371.

Palsy (G. paralysis, paralysis). Birth palsy—paralysis due to injury sustained during parturition, Erb-Duchenne syndrome (upper arm, 5th and 6th cervical nerve roots), or obstetric paralysis with deltoid involvement from injury to the brachial plexus, also called spastic diplegia. Brachial birth palsy—paralysis of the arm due to injury of brachial plexus during birth, Klumpke palsy (forearm FIG. 197 and hand weakened because of injury to lower roots of brachial plexus). Cerebral palsy—paralysis due to lesion of the brain, also called spastic diplegia. Lead palsy—weakness of hand gasp and paralysis of extensors of the wrist and fingers FIG. 281 resulting from degenerative changes in the posterior interosseous branch of the radial nerve produced by lead poisoning, also called Painter's palsy. Printer's palsy—polyneuritis in chronic antimony poisoning occurring in printers. Atrophy of muscles, loss of movement in hand and fingers. May have only one hand. Blakiston's New Gould Medical Dictionary.

Paralysis—(G. paralysis) Loss of muscle function or sensation, caused by injury to nerves or destruction of neurons. Acute ascending paralysis—includes flaccid paralysis involving the arms. Brachial paralysis—arm paralysis. Infantile paralysis—see polio. Ischemic paralysis—due to stoppage of blood circulation, as with embolism on thrombosis. Volkmann's paralysis—Paralysis of hand due to constriction of the blood supply FIG. 464 due to tight splints on casts on forearm. Blakiston's New Gould Medical Dictionary.

Phalangitis (G. phalagx, bone between two joints of the fingers on toes, itis-inflammation.) Phalangitis syphilitica. See dactyliris syphilitica. Phalangization—a plastic operation in which a metacarpal bone is separated from its fellows and surrounded with skin, thus forming a substitute for a finger or thumb. Phalangophalangeal amputation—removal of a finger on toe at the first on second phalangeal joints. Phalangectomy—Surgical excision of a phalanx of a finger or toe. Blakiston's New Gould Medical Dictionary.

Poliomyelitis (G. polios, gray; myelos, marrow; iris, inflammation)—Viral disease of man, with respiratory and gastrointestinal symptoms. Acute anterior Poliomyelitis—acute inflammation of the anterior horns of the gray matter of the spinal cord, common in children, producing paralysis of certain muscle groups or of entire limb; sudden onset, fever, gastrointestinal complaints, and pain in affected muscles, which atrophy rapidly, the reflexes are lost, and reaction of degeneration develops; also called infantile paralysis, epidemic paralysis, acute wasting paralysis, Heine-Medin's disease. Paralytic Poliomyelitis—damage to central nervous system, including flaccid paralysis, weakness, incoordination, muscle spasms, muscle tenderness, hyperesthesia, and disturbance of consciousness. Blakiston's New Gould Medical Dictionary.

Postinjury—Cause of CTS listed in "(CTS) review" in American Family Physician 49:6:1371.

Power grip—Non-metabolic disorder associated with CTS listed in "When to suspect (CTS)" in Consultant 33:12:40.

Pregnancy. (L. praegnans, pregenant.) Being with child, state of woman from conception to childbirth. Metabolic condition associated with CTS listed in "When to suspect (CTS)" in Consultant 33:12:40, and "(CTS) review" in American Family Physician 49:6:1371.

Proximal median neuropathy (L. proximus, nearest; G. neuron, nerve; pathos, disease). Cause of CTS listed in "(CTS) review" in American Family Physician 49:6:1371.

Proxima/lumbrical insertion (L. lumbricalis) One of four small muscles in the hand or foot. Cause of CTS listed in "(CTS) review" in American Family Physician 49:6:1371.

Quervain, Fritz de [Swiss surgeon, 1868–1940]. Described tenosynovitis of the extensor and abductor muscles of the thumb, called Quervain's disease, tendovaginitis stenosans. Blakiston's New Gould Medical Dictionary.

Quinquaud's phenomenon. A sideward oscillating movement in all fingers, probably due to intermittent contraction of the interosseous muscles; in almost any disease with tremors. Blakiston's New Gould Medical Dictionary.

Raynaud's Phenomenon. (G. phainomenon, to appear). An event or manifestation, generally of an unusual character. Maurice Raynaud, French physician, 1834–1881, famous for description and observation (1862) of a syndrome of vascular spasm in digital arteries. The color charges of digits seen when occurring secondarily to known arteriolar disease. FIG. 464. Blakiston's New Gould Medical Dictionary.

Renal failure. (L. renalis, of the kidneys). Cause of CTS listed in "When to suspect (CTS)" in Consultant 33:12:40; and in "(CTS) review" in American Family Physician 49:6:1371.

Rheumatoid arthritis. (G.pheuma, that which flows; eidos, form). See arthritis. Cause of CTS listed in "When to suspect (CTS)" in Consultant 33:12:40.

Rheumatoid tenosynovitis—See tenosynovitis. Cause of CTS listed in "When to suspect (CTS)" in Consultant 33:12:40.

Scarlet fever—Acute, contagious, febrile disease, with vomiting, chill, high fever, rapid pulse, sore throat, cervical adenitis, and punctiform, scarlet red eruption, strawberry tongue, and scaly desquamation; caused by hemolytic streptococcus. Blakiston's New Gould Medical Dictionary.

Scleroderma—(G. skeros, hard, G. derma, skin) A disease characterized by induration of the skin in localized patches or diffuse areas, and associated with atrophy of the epidermis and pigmentation. Vasomotor disturbances, myosclerosis, and calcinosis may occur. Also called scleriasis, dermatosclerosis, chorionitis. Collagen collects in the skin, fingers and hand FIG. 281, 464, and hardens. Blakiston's New Gould Medical Dictionary. This reduces movement of fingers. Similar to arthritis. It also collects in other organs, and may be fatal. This is a progressive disease. Rare. Cause of CTS listed in "When to suspect (CTS)" in Consultant 33:12:40.

Synovial proliferation nonspecific. (L. proles, offspring; ferre, to bear). The clear fluid which is normally present in joint cavities. Cause of CTS listed in "(CTS) review" in American Family Physician 49:6:1371.

Sprain fracture—An injury in which a tendon, together with a shell of bone, is torn from its attachment.

Stroke—Popular name for apoplexy.

Tactile anesthesia—(G. anaisthesia, lack of sensation) Loss of sense of touch. Blakiston's New Gould Medical Dictionary.

Tendinitis—Inflammation of the tendon.

Tenosynovitis (G. Tenon, tendon; synovia, synovia—clear fluid in joints; itis, inflammation.) Tuberculous Tenosynovitis—slow destructive tuberculosis of sheaths of tendon, tendons of wrist most commonly involved, treatment is synovectomy and excision of surrounding tuberculous tissue. Blakiston's New Gould Medical Dictionary. Sixty Joints in 2 hands, FIG. 201,202.

Thoracic outlet syndrome (G. thorax, thorax). Chest. Cause of CTS listed in "(CTS) review" in American Family Physician 49:6:1371.

Thyroid conditions (G. thyreoeides, shield shaped). Cause of CTS listed in "When to suspect (CTS)" in Consultant 33:12:40.

Trauma—(G. trauma, wound). Injury by mechanical agents. Sports injuries, etc.

Tumor Benign. See Lipoma, ganglion. See also Malignant tumor.—Cause of CTS listed in "(CTS) review" in American Family Physician 49:6:1371.

Q: What are the ligaments associated with one hand typing? (BR=British Revision of BNA terminology; OT=Old Term)

Carpometacarpal articulation of the thumb. Saddle.

Carpometacarpal articulations of fingers. Gliding. Dorsal carpometacarpal, Interosseous carpometacarpal, Volar carpometacarpal (palmar carpometacarpal BR).

Intercarpal: gliding (1) Distal (between 4 bones of distal row) Dorsal carpal (extensor retinaculum BR), Dorsal intercarpal. (2) Proximal (between 3 bones of proximal row) Interosseous intercarpal, Radiate or volar carpal, Radial collateral carpal (external lateral OT; lateral BR). (3) Transverse (Between proximal and distal rows), Transverse carpal (flexor retinaculum BR), Ulnar collateral carpal (internal lateral OT; medial BR), Volar intercarpal (palmar intercarpal BR).

Intermetacarpal (4 lateral metacarpal bases) gliding. Basal dorsal metacarpal (dorsal metacarpal BR), Basal interosseous metacarpal (interosseous metacarpal BR), Basal volar metacarpal (palmar metacarpal BR).

Interphalangeal of fingers. Hinge. Collateral (lateral phalangeal OT).

Metacarpophalangeal. Ball and Socket. Accessory volar (glenoid cartilage OT; palmar BR), Collateral (lateral phalangeal OT), Transverse of heads of metacarpals (deep transverse of palm BR).

Pisotriquetral. Gliding. Pisohamate, Pisometacarpal.

Wrist. Biaxial. Dorsal radiocarpal (posterior radiocarpal OT; BR), Radial collateral carpal (external lateral OT; lateral BR), Triangular articular disk (triangular fibrocartilage OT), Ulnar collateral carpal (internal lateral OT; medial BR), Volar radiocarpal (anterior radiocarpal BR).

Automatic Computer Assisted Design

Computer assisted design. The designers, architects, engineers, sit with the mouse under one hand and the other hand on the keyboard. A one handed keyboard would help make their character entry more efficient. One software version of this approach to drawing is called "Auto CAD".

The QWERTY (FIG. 1) keyboard arrangement appears as follows:

| | |
|---|---|
| Home Row | 1 2 3 4 5 6 7 8 9 0<br>Q W E R T Y U I O P<br>A S D F G H J K L ;<br>Z X C V B N M , . |

The present invention also provides a training system having a colors and bumps on the keys to help locate finger placement. This saves the time of looking down and referring to the keyboard to locate every letter as the typist practices the samples of letters and articles.

I claim:

1. A keyboard having a complete alphabet, punctuation marks, and Arabic numerals of a base ten system arranged in 3 or more rows, each row having 9 or more keys, the keys are lined in 9 or more columns and located on the keyboard based on a conventional QWERTY layout, said keyboard comprising:

a column of 1 Q A Z keys having the same shape, color and tactile stimulus;

a column of 2 W S X keys having the same shape, color and tactile stimulus which are different from the shape, color and tactile stimulus of the 1 Q A Z keys on the left and a column of 3 E D C keys on the right;

a column of 3 E D C keys having the same shape, color and tactile stimulus which are different from the shape, color and tactile stimulus of the 2 W S X keys on the left and a column of 4 R F V keys on the right;

a column of 4 R F V keys and a column of 5 T G B keys having the same shape, color and tactile stimulus which are different from the shape, color and tactile stimulus of the 3 E D C keys on the left and a column of 6 Y H N keys on the right;

a column of 6 Y H N keys and a column of 7 U J M keys having the same shape, color and tactile stimulus which are different from the shape, color and tactile stimulus of the 5 T G B keys on the left and a column of 8 I K comma keys on the right;

a column of 8 I K comma keys having the same shape, color and tactile stimulus which are different from the shape, color and tactile stimulus of the 7 U J M keys on the left and a column of 9 O L period keys on the right; and a column of 9 O L period keys having the same shape, color and tactile stimulus which are different from the shape, color and tactile stimulus of the 8 I K comma keys on the left and a column of zero P semicolon slash keys on the right.

2. A keyboard for left hand use only having a complete alphabet, punctuation marks, and Arabic numerals of a base ten system arranged in 3 or more rows, each row having 9 or more keys, the keys are lined in 9 or more columns, and located on the keyboard based on a conventional QWERTY layout, said keyboard comprising:

from the bottom and left, the first keys on rows 1 and 2, the first and second keys on row 3, and the first, second, third and fourth keys on row 4 being made with the same shape, color and tactile stimulus surfaces for touch-typing by an operator, said shape, color and tactile stimulus surfaces of the above identified keys being different from that of the second keys on rows 1 and 2, the third key on row 3 and the fifth key on row 4;

the second, third and fourth keys on rows 1 and 2, the third and fourth keys on row 3, and the fifth key on row 4 being made with the same shape, color and tactile stimulus surfaces for touch-typing by the left pinky finger of the operator, said shape, color and tactile stimulus surfaces of the above identified keys being different from that of the first and fifth keys on rows 1 and 2, the second and fifth keys on row 3, and the fourth and sixth keys on row 4;

the fifth keys on each of rows 1–3 and the sixth key on row 4 being made with the same shape, color and tactile stimulus for touch-typing by the left ring finger of the operator, said shape, color and tactile stimulus surfaces being different from that of the fourth and sixth keys on each of rows 1–3, and fifth and seventh keys on row 4;

the sixth key on each of rows 1–3, and the seventh key on row 4 being made with the same shape, color and tactile stimulus surfaces for touch-typing by the left middle finger of the operator, said shape, color and tactile stimulus surfaces of the above identified keys being different from that of the fifth and seventh keys on each of rows 1–3, and sixth and eighth keys on row 4;

the seventh, eighth and ninth keys on each of rows 1–3, and the eighth and ninth keys on row 4 being made with the same shape, color and tactile stimulus surfaces for touch-typing by the left index finger of the operator, said shape, color and tactile stimulus surfaces of the above identified keys being different from that of the sixth and tenth keys on each of rows 1–3, and seventh and tenth keys on row 4; and the remaining keys on each of rows 1–4 being made with the same shape, color and tactile stimulus surfaces for touch-typing by the operator, said shape, color and tactile stimulus surfaces of the remaining keys being different from that of the ninth keys on each of rows 1–4.

3. A keyboard for right hand use only having a complete alphabet, punctuation marks, and Arabic numerals of a base ten system arranged in 3 or more rows, each row having 9 or more keys, the keys are lined in 9 or more columns, and located on the keyboard based on a conventional QWERTY layout, said keyboard comprising:

from the bottom and left, the first key on row 1, the first and second keys on each of rows 2 and 3, and the first, second, third and fourth keys on row 4 being made with the same shape, color and tactile stimulus surfaces for touch-typing by an operator, said shape, color and tactile stimulus surfaces of the above identified keys being different from that of the second key on row 1, the third key on each of rows 2 and 3, and the fifth key on row 4;

the second, third, fourth and fifth keys on row 1, the third, fourth and fifth keys on each of rows 2 and 3, and the fifth and sixth keys on row 4 being made with the same shape, color and tactile stimulus surfaces for touch-typing by the right index finger of the operator, said shape, color and tactile stimulus surfaces of the above identified keys being different from that of the first and sixth keys on row 1, the second and sixth keys on each of rows 2 and 3, and the fourth and seventh keys on row 4;

the sixth keys on each of rows 1–3 and the seventh key on row 4 being made with the same shape, color and tactile stimulus for touch-typing by the right middle finger of the operator, said shape, color and tactile stimulus surfaces being different from that of the fifth and seventh keys on each of rows 1–3, and sixth and eighth keys on row 4;

the seventh key on each of rows 1–3, and the eighth key on row 4 being made with the same shape, color and tactile stimulus surfaces for touch-typing by the right ring finger of the operator, said shape, color and tactile stimulus surfaces of the above identified keys being different from that of the sixth and eighth keys on each of rows 1–3, and seventh and ninth keys on row 4;

the eighth and ninth keys on each of rows 1–2, the eighth, ninth and tenth keys on row 3, and the ninth key on row 4 being made with the same shape, color and tactile stimulus surfaces for touch-typing by the right pinky finger of the operator, said shape, color and tactile stimulus surfaces of the above identified keys being different from that of the seventh and tenth keys on each of rows 1–2, the seventh and eleventh keys on row 3, and eighth and tenth keys on row 4; and the remaining keys on each of rows 1–4 being made with the same shape, color and tactile stimulus surfaces for touch-typing by the operator, said shape, color and tactile stimulus surfaces of the remaining keys being different from that of the ninth keys on each of rows 1, 2 and 4, and the tenth key on row 3.

* * * * *